(12) United States Patent
Worsley et al.

(10) Patent No.: US 9,314,777 B2
(45) Date of Patent: Apr. 19, 2016

(54) HIGH SURFACE AREA GRAPHENE-SUPPORTED METAL CHALCOGENIDE ASSEMBLY

(71) Applicant: Lawrence Livermore National Security, LLC, Livermore, CA (US)

(72) Inventors: Marcus A. Worsley, Hayward, CA (US); Joshua Kuntz, Livermore, CA (US); Christine A. Orme, Oakland, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 386 days.

(21) Appl. No.: 13/844,225

(22) Filed: Mar. 15, 2013

(65) Prior Publication Data
US 2014/0121425 A1    May 1, 2014

Related U.S. Application Data

(60) Provisional application No. 61/676,732, filed on Jul. 27, 2012.

(51) Int. Cl.
*B01J 27/051* (2006.01)
*C10G 49/04* (2006.01)
(Continued)

(52) U.S. Cl.
CPC ............... *B01J 27/051* (2013.01); *B01J 21/18* (2013.01); *B01J 27/02* (2013.01); *B01J 35/04* (2013.01);
(Continued)

(58) Field of Classification Search
CPC ........ B01J 27/04; B01J 27/043; B01J 27/047; B01J 27/049; B01J 27/051; B01J 27/0515; B01J 27/057; C10G 11/06; C10G 45/08; C10G 45/38; C10G 45/50; C10G 47/06; C10G 47/02; C10G 49/04; C10G 2300/10; C10G 2300/1011
USPC .......... 502/215, 219–222; 208/108, 143, 209, 208/213, 254 H, 134, 216 R, 217, 243, 244; 977/734
See application file for complete search history.

(56) References Cited

U.S. PATENT DOCUMENTS

| 5,207,814 A | 5/1993 | Cogliati et al. |
| 5,879,744 A | 3/1999 | Cao et al. |

(Continued)

FOREIGN PATENT DOCUMENTS

WO    2011/128213    * 10/2011    .............. C25B 11/04

OTHER PUBLICATIONS

U.S. Appl. No. 13/844,175, filed Mar. 15, 2013, Lawrence Livermore National Security, LLC.
(Continued)

*Primary Examiner* — Patricia L Hailey
(74) *Attorney, Agent, or Firm* — Foley & Lardner LLP

(57) ABSTRACT

A composition comprising at least one graphene-supported assembly, which comprises a three-dimensional network of graphene sheets crosslinked by covalent carbon bonds, and at least one metal chalcogenide compound disposed on said graphene sheets, wherein the chalcogen of said metal chalcogenide compound is selected from S, Se and Te. Also disclosed are methods for making and using the graphene-supported assembly, including graphene-supported $MoS_2$. Monoliths with high surface area and conductivity can be achieved. Lower operating temperatures in some applications can be achieved. Pore size and volume can be tuned.

34 Claims, 6 Drawing Sheets

(51) Int. Cl.
| | |
|---|---|
| B01J 37/03 | (2006.01) |
| B01J 37/16 | (2006.01) |
| B01J 21/18 | (2006.01) |
| B01J 27/02 | (2006.01) |
| B01J 35/04 | (2006.01) |
| B01J 35/10 | (2006.01) |
| B01J 27/04 | (2006.01) |

(52) U.S. Cl.
CPC .......... *B01J 35/1019* (2013.01); *B01J 35/1047* (2013.01); *B01J 37/036* (2013.01); *B01J 37/16* (2013.01); *C10G 49/04* (2013.01); *B01J 27/04* (2013.01)

(56) References Cited

U.S. PATENT DOCUMENTS

| | | | |
|---|---|---|---|
| 5,885,953 | A | 3/1999 | Jadesjo et al. |
| 7,378,188 | B2 | 5/2008 | Struthers et al. |
| 7,410,718 | B2 | 8/2008 | Cooper et al. |
| 7,811,711 | B2 | 10/2010 | Cooper et al. |
| 8,480,931 | B2* | 7/2013 | Choi et al. ............ 252/502 |
| 8,664,143 | B2 | 3/2014 | Worsley et al. |
| 8,685,287 | B2 | 4/2014 | Worsley et al. |
| 2005/0115872 | A1* | 6/2005 | Thomazeau et al. ...... 208/216 R |
| 2009/0305135 | A1* | 12/2009 | Shi et al. ............ 429/217 |
| 2010/0187484 | A1 | 7/2010 | Worsley et al. |
| 2011/0129675 | A1* | 6/2011 | Choi et al. ............ 428/408 |
| 2011/0245378 | A1* | 10/2011 | Russ et al. ............ 523/440 |
| 2012/0021293 | A1* | 1/2012 | Zhamu et al. ............ 429/231.5 |
| 2012/0034442 | A1 | 2/2012 | Pauzauskie et al. |
| 2012/0077006 | A1 | 3/2012 | Worsley et al. |
| 2012/0122652 | A1 | 5/2012 | Worsley et al. |
| 2012/0214068 | A1* | 8/2012 | Dai et al. ............ 429/224 |
| 2013/0068613 | A1* | 3/2013 | Hu et al. ............ 204/290.13 |

OTHER PUBLICATIONS

Abrams, B.L. et al. (2005) "Nanosize Semiconductors for Photooxidation," Critical Reviews in Solid State and Materials Sciences 30:153-182.

Baumann, T.F. et al. (2008) "High surface area carbon aerogel monoliths with hierarchical porosity," Journal of Non-Crystalline Solids 354:3513-3515.

Benck, J.D. et al. (2012) "Amorphous Molybdenum Sulfide Catalysts for Electrochemical Hydrogen Production: Insights into the Origin of their Catalytic Activity," ACS Catal. 2:1916-1923.

Biener, J. et al. (2011) "Advanced carbon aerogels for energy applications," Energy & Environmental Science 4:656-667.

Chang, K. et al. (2011) "Graphene-like MoS2/amorphous carbon composites with high capacity and excellent stability as anode materials for lithium ion batteries," J. Mater. Chem. 21:6251-6257.

Chang, K. et al. (2011) "Single-layer MoS2/graphene dispersed in amorphous carbon: towards high electrochemical performances in rechargeable lithium ion batteries," J. Mater. Chem. 21:17175-17184.

Chianelli, R.R. et al. (2006) "Catalytic Properties of Single Layers of Transition Metal Sulfide Catalytic Materials," Catalysis Reviews 48:1-41.

Farag, H. et al. (1999) "Carbon versus alumina as a support for Co-Mo catalysts reactivity towards HDS of dibenzothiophenes and diesel fuel," Catalysis Today 50(1):9-17.

Hummers, Jr., W.S. et al. (1958) "Preparation of Graphitic Oxide," J. Am. Chem. Soc. 80:1339.

Jaramillo, T.F. et al. (2008) "Hydrogen Evolution on Supported Incomplete Cubane-type [Mo3S4]4 Electrocatalysts," J. Phys. Chem. C 112(45):17492-17498.

Kibsgaard, J. et al. (2012) "Engineering the surface structure of MoS2 to preferentially exppose active edge sites for electrocatalysis," Nature Materials 11:963-969.

Lauritsen, J.V. et al. (2004) "Atomic-scale insight into structure and morphology changes of MoS2 nanoclusters in hydrotreating catalysts," Journal of Catalysis 221(2):510-522.

Lauritsen, J.V. et al. (2004) "Hydrodesulfurization reaction pathways on MoS2 nanoclusters revealed by scanning tunneling microscopy," Journal of Catalysis 224(1):94-106.

Li, H. et al. (2009) "Synthesis of MoS2/C nanocomposites by hydrothermal route used as Li-ion intercalation electrode materials," Materials Letters 63:1363-1365.

Li, Y. et al. (2011) "MoS2 Nanoparticles Grown on Graphene: An Advanced Catalyst for the Hydrogen Evolution Reaction," Journal of the American Chemical Society 133:7296-7299.

Li, Y. et al. (2012) "Enhanced Li Adsorption and Diffusion on MoS2 Zigzag Nanoribbons by Edge Effects: A Computational Study," J. Phys. Chem. Lett. 3:2221-2227.

Merki, D. et al. (2011) "Amorphous molybdenum sulfide films as catalysts for electrochemical hydrogen production in water," Chemical Science 2:1262-1267.

Merki, D. et al. (2011) "Recent developments of molybdenum and tungsten sulfides as hydrogen evolution catalysts," Energy Environ. Sci. 4:3878-3888.

Nogueira, A. et al. (2012) "Curved nanostructures of unsupported and Al2O3-supported MoS2 catalysts: Synthesis and HDS catalytic properties," Applied Catalysis A: General 429-430:92-105.

Song, C. et al. (1992) "Influence of pore structure and chemical properties of supported molybdenum catalysts on their performance in upgrading heavy coal liquids," Energy & Fuels 6(5):619-628.

Thurston, T.R. et al. (1999) "Photooxidation of Organic Chemicals Catalyzed by Nanoscale MoS2," J. Phys. Chem. B 103:11-17.

Wilcoxon, J.P. (1997) "Photooxidation of Organic Wastes Using Semiconductor Nanoclusters," U.S. Deparatment of Energy Final Report:1-22.

Worsley, M.A. et al. (2009) "Mechanically robust and electrically conductive carbon nanotube foams," Applied Physics Letters 94:073115.

Worsley, M.A. et al. (2010) "Synthesis of Graphene Aerogel with High Electrical Conductivity," J. Am. Chem. Soc. 132:14067-14069.

Worsley, M.A. et al. (2011) "High Surface Area, sp2-Cross-Linked Three-Dimensional Graphene Monoliths," J. Phys. Chem. Lett. 2:921-925.

Worsley, M.A. et al. (2012) "Mechanically robust 3D graphene macroassembly with high surface area," Chem. Commun. 48:8428-8430.

\* cited by examiner

HIGH SURFACE AREA GRAPHENE-SUPPORTED METAL CHALCOGENIDE ASSEMBLY

RELATED APPLICATIONS

This Application claims priority to U.S. provisional application 61/676,732 filed Jul. 27, 2012, which is incorporated herein by reference in its entirety.

FEDERAL FUNDING STATEMENT

The United States Government has rights in the invention pursuant to Contract No. DE-AC52-07NA27344 between the U.S. Department of Energy and Lawrence Livermore National Security, LLC, for the operation of Lawrence Livermore National Laboratory.

BACKGROUND

A cost effective and environmentally sound method to convert heavy hydrocarbon feedstocks to liquid fuel would allow the United States to dramatically expand the use of biofeedstocks and non-conventional hydrocarbon resources, including its vast coal reserves. This would enhance the economic and energy security of the United States by reducing import of energy from foreign sources. However, current methods to convert coal and biofeedstocks to liquid require high temperatures that in turn lead to significant energy consumption and high $CO_2$ emissions.

To realize the potential of unconventional feedstocks in an environmentally sound way, more efficient methods are needed to increase the hydrogen-to-carbon mole ratio (see FIG. 4). Catalysts based on molybdenum disulfide that add hydrogen and remove impurities are widely used in conventional petroleum upgrading, but despite the substantial overlap in process chemistry, they lack sufficient activity and stability in coals and biofeedstocks conversion processes. More stable and active catalysts are needed both as disposable or recyclable particles added to slurries during the liquefaction stage and as shaped catalysts that convert coal and bio-derived liquids to refined products within an ebullating or fixed bed reactor. Currently the best hydrotreating catalysts (not utilizing precious metals) are base metal (e.g., Ni, Co, Mo, W) sulfides deposited onto porous alumina supports of various densities and porosities. Base metal sulfide catalysts are unique because they are insensitive to sulfur poisoning and are active in a wide range of temperatures and $H_2$ pressures.

However, the porous alumina-supported metal sulfide assembly has limited surface area (<250 $m^2/g$), is insulating, and generally requires high temperature for activating the catalyst. Thus, an unmet need exists for an improved porous assembly that has higher surface area, is conductive, has low operating temperature, and enables electrochemical deposition and electrochemical catalysis.

SUMMARY

Embodiments provided herein include compositions, methods and devices.

For example, described here is a composition comprising at least one graphene-supported assembly, which comprises (i) a three-dimensional network of graphene sheets crosslinked by covalent carbon bonds and (ii) at least one metal chalcogenide compound disposed on said graphene sheets, wherein the chalcogen of said metal chalcogenide compound is selected from S, Se and Te.

In one embodiment, the metal chalcogenide compound is a catalyst for hydrogenation, hydrodeoxygenation, hydrodesulfurization, hydrodenitrogenation, and/or hydrocracking.

In one embodiment, wherein the graphene-supported assembly is electrically conductive. In one embodiment, the graphene-supported assembly has a conductivity of at least 0.5 S/cm.

In one embodiment, the graphene-supported assembly is a monolith having a size of at least 1 $mm^3$. In one embodiment, the graphene-supported assembly has an elastic modulus of at least 10 Mpa.

In one embodiment, the chalcogen is S. In one embodiment, the metal chalcogenide compound comprises one or more of Mo, W, Fe, Cd, In, Zn, Ni and Co. In one embodiment, the metal chalcogenide compound comprises Mo and optionally comprises another metal. In one embodiment, the metal chalcogenide compound comprises $MoS_2$, $WS_2$, $In_2S_3$, CdTe, ZnTe, or any combination thereof. In one embodiment, the metal chalcogenide compound comprises $MoS_2$.

In one embodiment, the metal chalcogenide compound accounts for at least 20 wt % of the graphene-supported assembly.

In one embodiment, the graphene-supported assembly has a surface area of at least 250 $m^2/g$. In one embodiment, the graphene-supported assembly has a mesopore volume of at least 1 $cm^3/g$.

In one embodiment, the metal chalcogenide compound comprises $MoS_2$, wherein the metal chalcogenide compound accounts for at least 30 wt % of the graphene-supported assembly, wherein the graphene-supported assembly has a surface area of at least 300 $m^2/g$; and wherein the graphene-supported assembly is a monolith having a size of at least 1 $mm^3$.

In one embodiment, the surfaces of the graphene sheets are substantially free of carbon nanoparticles, and wherein the covalent carbon bonds crosslinking the graphene sheets are primarily $sp^2$ bonds.

In one embodiment, the metal chalcogenide compound is Ni—Mo-sulfide or Co—Mo-sulfide. In one embodiment, the composition further comprising (iii) at least one metal oxide, metal carbide or metal nitride deposited on said graphene sheets.

Also described here is a method for making the aforementioned graphene-supported assembly, comprising: (A) preparing a reaction mixture comprising (i) graphene oxide (GO), (ii) at least one precursor of a metal chalcogenide compound, and (iii) at least one catalyst; (B) curing the reaction mixture to produce a gel; (C) reducing the gel with at least one reducing agent; and (D) drying the gel to produce a graphene-based monolith.

In one embodiment, the reaction mixture comprises at least one organic solvent and/or water. In one embodiment, the catalyst comprises ammonium hydroxide. In one embodiment, the reducing agent comprises hydrazine. In one embodiment, the precursor of the metal chalcogenide compound is $(NH_4)_2MoS_4$.

In one embodiment, the reaction mixture is cured at a temperature of 100° C. or less. In one embodiment, the reaction mixture is cured at ambient pressure.

In one embodiment, the step of drying the gel comprises solvent exchange. In one embodiment, the step of drying the gel comprises supercritical drying.

In one embodiment, the method further comprises annealing the dry gel at a temperature of at least 600° C. in an inert atmosphere.

In one embodiment, the metal chalcogenide compound is $MoS_2$. In one embodiment, the metal chalcogenide compound is $MoS_2$, and wherein the method further comprises incorporating Ni or Co into the graphene-supported assembly.

In one embodiment, the method comprises simultaneous gelation and reduction of graphene oxide and $(NH_4)_2MoS_4$ at a temperatures of 100° C. or less.

In one embodiment, the method comprises: dispersing GO in a solution of DMF and water via bath sonication to produce a suspension, dissolved $(NH_4)_2MoS_4$ into said suspension, adding ammonium hydroxide to said suspension, heating said suspension to produce a gel, adding hydrazine to said gel, heating said gel and said hydrazine to produce a $MoS_2$-coated gel, washing said $MoS_2$-coated gel in acetone, supercritically drying said gel with liquid carbon dioxide, and annealing the dry gel.

Also described is another method for making the aforementioned graphene-supported assembly, comprising: (A) providing a graphene aerogel, wherein the graphene aerogel comprises a three-dimensional network of graphene sheets crosslinked by covalent carbon bonds; immersing said graphene aerogel in a solution comprising at least one precursor of a metal chalcogenide compound to form a mixture; (B) curing said mixture to obtain a wet gel; (C) drying said wet gel to obtain a dry gel; and (D) annealing said dry gel to obtain the graphene-supported assembly.

In one embodiment, the step of curing comprises curing wet gel at a temperature of 100° C. or less, wherein the step of drying comprises solvent exchange and supercritical drying, and wherein the step of annealing comprises annealing the dry gel at least 600° C. in an inert atmosphere.

In one embodiment, metal chalcogenide compound is $MoS_2$, and wherein the method further comprises incorporating Ni or Co into the graphene-supported assembly.

Additionally described is a method for using aforementioned graphene-supported assembly, comprising contacting said monolith with at least one hydrocarbon feedstock.

In one embodiment, said hydrocarbon source comprises coal, biofeedstock, and/or petroleum feedstock.

In one embodiment, the metal chalcogenide compound catalyzes the hydrogenation, hydrodeoxygenation, hydrodesulfurization, hydrodenitrogenation, and/or hydrocracking of the hydrocarbon feedstock.

In one embodiment, the metal chalcogenide compound is Ni—Mo-sulfide or Co—Mo-sulfide.

In one embodiment, the method further comprises applying an electrical bias to the monolith to enhance the catalysis.

One advantage of the graphene-supported metal chalcogenide assembly described herein, for at least one embodiment, is high surface area.

Another advantage of the graphene-supported metal chalcogenide assembly described herein, for at least one embodiment, is high conductivity.

Another advantage of the graphene-supported metal chalcogenide assembly described herein, for at least one embodiment, is lower operating temperature.

Another advantage of the graphene-supported metal chalcogenide assembly described herein, for at least one embodiment, is the enablement of electrochemical deposition and electrocatalysis.

An additional advantage of the graphene-supported metal chalcogenide assembly described herein, for at least one embodiment, is the large and tunable pore volume.

An additional advantage of the graphene-supported metal chalcogenide assembly described herein, for at least one embodiment, is the tunable pore size.

DETAILED DESCRIPTION

Introduction

Figure 1:
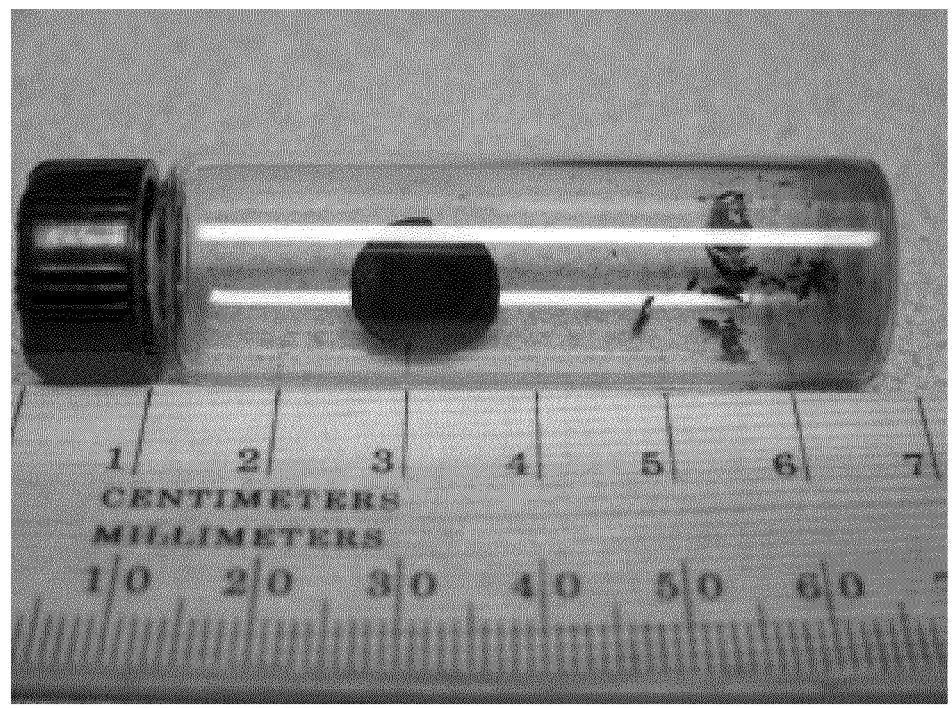
FIG. 1 shows an exemplary graphene-supported $MoS_2$ monolith after drying.

References cited herein can be used to practice and better understand the claimed inventions and are incorporated herein by reference in their entireties for all purposes.

The article, "Mechanically Robust 3D Graphene Macroassembly with High Surface Area," Worsley et al., *Chem. Commun.*, 2012, 48, 8428-8430, is incorporated herein by reference in its entirety.

The article, "Synthesis of Graphene Aerogel with High Electrical Conductivity," Worsley et al., *J. Am. Chem. Soc.*, 2011, 2, 921-925, is incorporated herein by reference in its entirety.

The article, "High Surface Area, sp2-Cross-Linked Three-Dimensional Graphene Monolith," Worsley et al., *J. Phys. Chem. Letter*, 2010, 132(40), 14067-14069, is incorporated herein by reference in its entirety.

The article, "Mechanically robust and electrically conductive carbon nanotube foams," Worsley et al., *Appl. Phys. Lett.*, 2009, 94, 073115, is incorporated herein by reference in its entirety.

The article, "High surface area carbon aerogel monoliths with hierarchical porosity," Baumann et al., *J. Non-Cryst. Solids*, 2008, 354, 3513, is incorporated herein by reference in its entirety.

The article, "Advanced Carbon Aerogels for Energy Applications," Biener et al., *Energy & Environmental Science*, 2011, 4, 656-667, is incorporated herein by reference in its entirety.

US Patent Publication 2012/0034442 to Worsley et al., "Mechanically Stiff, Electrically Conductive Composites of Polymers and Carbon Nanotubes" is incorporated herein by reference in its entirety.

Graphene-Supported Assembly

Many embodiments described herein relate to a composition comprising at least one graphene-supported assembly, which comprises (i) a three-dimensional network of graphene sheets crosslinked by covalent carbon bonds and (ii) at least one metal chalcogenide compound disposed on said graphene sheets, wherein the chalcogen of said metal chalcogenide compound is selected from S, Se and Te.

The metal chalcogenide compound can comprises, for example, S. The metal chalcogenide compound can be, for example a metal sulfide. Combination of metal sulfide can be used.

The metal chalcogenide compound can comprises, for example, one or more metals. The metal chalcogenide compound can comprises, for example, at least one of Mo, W, Fe, Cd, In, Zn, Ni and Co. The metal chalcogenide compound can comprise, for example, at least one of Mo and S. The metal chalcogenide compound can comprise, for example, Mo and another metal, such as Ni or Co.

The metal chalcogenide compound can comprise, for example, at least one of $MoS_2$, $WS_2$, $In_2S_3$, CdTe and ZnTe, or any combination thereof. Blend of $MoS_2$ and $WS_2$ can be used. The metal chalcogenide compound can comprise, for example, Ni—Mo-sulfide or Co—Mo-sulfide.

The metal chalcogenide compound can be, for example, a catalyst for hydrogenation. The metal chalcogenide compound can be, for example, a catalyst for hydrodeoxygenation. The metal chalcogenide compound can be, for example, a catalyst for hydrodenitrogenation. The metal chalcogenide compound can be, for example, a catalyst for hydrocracking.

The weight percentage of metal chalcogenide in the graphene-supported metal chalcogenide assembly can be, for example, 5-95%, or 10-90%, or 20-80%, or 30-60%, or at least 20%, or at least 30%, or at least 50%.

The graphene-supported metal chalcogenide assembly described herein can be a monolith that is mechanically robust, electrically conductive, and of high-surface area. Monolith is a term known in the art. Monolith and methods for making monolith are disclosed in, for example, U.S. Pat. Nos. 5,207,814, 5,885,953, 5,879,744, 7,378,188, 7,410,718, and 7,811,711. The graphene-supported metal chalcogenide assembly can also be a powder or in particle form produced by, for example, grinding or ball-milling the monolith described herein. Methods for conversion to particle or powder form can be adapted to preserve the structures described herein. Particle or powder size can be varied with the methods and instruments used.

The graphene-supported metal chalcogenide assembly can be a monolith having a size of, for example, or $10^3$ μm$^3$ or more, or $10^6$ μm$^3$ or more, or 1 mm$^3$ or more, or 1 cm$^3$ or more, or about $10^3$ μm$^3$ to about 1 mm$^3$, or from about 1 mm$^3$ to about $10^3$ cm$^3$.

The graphene-supported metal chalcogenide assembly can have a thickness of, for example, 10 μm or more, or 100 μm or more, or 1 mm or more, or 1 cm or more, or about 10 μm to about 1 mm, or about 1 mm to about 10 cm.

The graphene-supported metal chalcogenide assembly can have a conductivity of, for example, at least 0.5 S/cm, or at least 1 S/cm, or at least 2 S/cm, or at least 5 S/cm, or about 0.5-10 S/cm.

The graphene-supported metal chalcogenide assembly described herein can have a surface area of, for example, of 250 m$^2$/g or more, or 300 m$^2$/g or more, or 350 m$^2$/g or more, or 400 m$^2$/g or more, or 450 m$^2$/g or more, or about 250-750 m$^2$/g.

The graphene-supported metal chalcogenide assembly described herein can have a mesopore volume of, for example, of 0.2 cm$^3$/g or more, or 0.5 cm$^3$/g or more, or 0.8 cm$^3$/g or more, or 1 cm$^3$/g or more, or 1.2 cm$^3$/g or more, or about 0.2 to 2 cm$^3$/g.

The graphene-supported metal chalcogenide assembly described herein can have an compressive modulus of, for example, 10 MPa or more, or 25 MPa or more, or 50 MPa or more, or about 10-50 MPa.

The graphene-supported metal chalcogenide assembly described herein can comprise a three-dimensional network of graphene sheets crosslinked by covalent carbon bonds, wherein 50% or more, or 70% or more, or 90% or more of the crosslinking covalent bonds are sp$^2$ bonds.

The graphene-supported metal chalcogenide assembly described herein can be substantially free of graphene sheets interconnected only by physical crosslinks (e.g. Van der Waals forces). For example, the graphene-supported metal chalcogenide assembly can comprise less than 20%, or less than 10%, or less than 5%, or less than 1% of graphene sheets interconnected only by physical crosslinks.

The graphene-supported metal chalcogenide assembly described herein can be substantially free of graphene sheets interconnected only by metal crosslinks (e.g., noble metal such as Pd). For example, the graphene-supported metal chalcogenide assembly can comprise less than 20%, or less than 10%, or less than 5%, or less than 1% of the graphene sheets interconnected only by metal crosslinks. The three-dimensional network of graphene sheets is not made by stacking non-organic material, such as metals, between graphene sheets.

The graphene-supported metal chalcogenide assembly described herein can be substantial free of graphene sheets with hydroxyl or epoxide functionalities. For example, the graphene-supported metal chalcogenide assembly can comprise 5% or less, or 3% or less, or 1% or less, or 0.5% or less, or 0.1% or less of the carbon atoms connected to a hydroxyl or epoxide functionality.

The surfaces of the graphene sheets can be, for example, substantially free of carbon nanoparticles.

The metal chalcogenide can be deposited in the form of nanoparticles in the graphene-supported assembly described herein. The metal chalcogenide can be deposited in the form of a film in the graphene-supported assembly described herein. The metal chalcogenide can be deposited in the form of a conformal coating in the graphene-supported assembly described herein.

The graphene-supported metal chalcogenide assembly described herein can further comprise, for example, at least one metal oxide (e.g., $ZrO_2$ or zeolites), metal carbide or metal nitride deposited on the graphene sheets. As a result, the graphene-supported metal chalcogenide assembly can be a multifunctional monolithic catalyst suitable for use in a reactor bed of, for example, a coal liquefaction facility. Such metal oxide, metal carbide or metal nitride can be pre-fabricated on the graphene monolith before the deposition of the metal chalcogenide compound.

Process for Making Graphene-Supported Metal Chalcogenide Assembly

Many embodiments described herein relate to a method for making the aforementioned graphene-supported metal chalcogenide assembly, comprising: (A) preparing a reaction mixture comprising (i) graphene oxide (GO), (ii) at least one precursor of a metal chalcogenide compound, and (iii) at least one catalyst; (B) curing the reaction mixture to produce a gel; (C) reducing the gel with at least one reducing agent; and (D) drying the gel to produce a graphene-based monolith.

Methods for making GO are known in the art and disclosed in, for example, Hummer, *J. Am. Chem. Soc.*, 80:1339 (1958), which is incorporated herein by reference in its entirety.

The reaction mixture can comprise, for example water and/or at least one organic solvents, such as alcohol, dimethylformamide, tetrahydrofuran, ethylene glycol, N-methylpyrrolidone, etc. The GO can be dispersed first in an aqueous suspension by sonicating GO in deionized water. The time for sonication can range from 0.5-24 hours. The concentration of GO in the reaction mixture can be 0.1 mg/cc or more, or 1 mg/cc or more, or 2 mg/cc or more, or 5 mg/cc or more, or 10 mg/cc or more.

The catalyst in the reaction mixture can be an acid catalyst. The catalyst in the reaction mixture can be a base catalyst. Catalysts suitable for making graphene-supported aerogels include, but are not limited to, nitric acid, acetic acid, ascorbic acid, hydrochloric acid, sulfuric acid, sodium carbonate, sodium hydroxide, ammonium hydroxide, and calcium sulfate. The reactant-to-catalyst ratio may range from 10 to greater than 1000. In a particular embodiment, the catalyst is ammonium hydroxide.

The precursor of the metal chalcogenide compound can be, for example, a molybdenum salt or a tungsten salt. In a particular embodiment, the precursor of the metal chalcogenide compound is $(NH_4)_2MoS_4$. In another particular embodiment, the precursor of the metal chalcogenide compound is $MoO_3$. The precursor can also be, for example, a metal oxide or metal thiomettallate applicable for other sulfides (e.g., W, Ni, Co, Fe, etc.)

The reducing agent can be, for example, hydrazine, ammonia, hydrogen sulfide, hydrogen/nitrogen, hydrogen/argon, etc. In a particular embodiment, the reducing agent is hydrazine.

The reaction mixture can be cured at a temperature of 100° C. or less to produce the wet gel. The reaction mixture can be cured at, for example, 25-100° C. In a particular embodiment, the reaction mixture is cured at 85° C. for 4-168 hours. The reaction mixture can be cured at atmospheric pressure.

The wet gel can be subjected to solvent exchange to remove reaction by-products. Suitable solvent include, but are not limited to, DI water. The wet gel can also be subjected to solvent exchange to remove water. Suitable solvents include, but are not limited to, acetone.

The wet gel can be dried in a supercritical gas to produce a dry gel. Suitable supercritical gases include, but are not limited to, supercritical $CO_2$. The wet gel can also be dried under ambient temperature and ambient pressure for an extended time, such as at least 24 hours.

The dry gel can be annealed/pyrolyzed in an inert gas at elevated temperature. Suitable inert gases include, but are not limited to, $N_2$. The dry gel can be annealed/pyrolyzed at, for example, 600° C. or more, or 800° C. or more, or 1000° C. or more. The graphene-based assembly can be carbonized by the annealing/pyrolyzing step.

Wherein a graphene-supported metal chalcogenide assembly is fabricated according to the method described herein, the method can further comprise incorporating a promoter metal, such as Ni or Co, into the graphene-supported assembly. For example, the incorporation of Ni or Co can produce a graphene-supported Ni—Mo-sulfide assembly or a graphene-supported Co—Mo-sulfide assembly. The method can comprise the impregnation of a salt of the promoter metal after impregnating the metal halogenide precursor, and the subsequent reduction using the reducing agents described herein. Metal oxides and metal thiomettallates can also be incorporated into the graphene-supported assembly in this way.

In some embodiments, the method for making the aforementioned graphene-supported metal chalcogenide assembly comprises (i) the simultaneous gelation, and (ii) the simultaneous reduction, of graphene oxide and $(NH_4)_2MoS_4$ at a temperatures of 100° C. or less.

In some embodiments, the method for making the aforementioned graphene-supported metal chalcogenide assembly comprises: (a) dispersing GO in a solution of DMF and water via bath sonication to produce a suspension; (b) dissolved $(NH_4)_2MoS_4$ into said suspension; (c) adding ammonium hydroxide to said suspension; (d) heating said suspension to produce a first gel; (e) adding hydrazine to said first gel; (f) heating said first gel and said hydrazine to produce a second gel; (g) washing said second gel in acetone; and (h) supercritically drying said second gel with liquid carbon dioxide.

Further embodiments for making the aforementioned graphene-supported metal chalcogenide assembly comprises: (A) providing a graphene aerogel, wherein the graphene aerogel comprises a three-dimensional network of graphene sheets crosslinked by covalent carbon bonds; (B) immersing said graphene aerogel in a solution comprising at least one precursor of a metal chalcogenide compound to form a mixture; (C) curing said mixture to obtain a wet gel; (D) drying said wet gel to obtain a dry gel; and (E) annealing said dry gel to obtain the graphene-supported assembly.

The fabrication of graphene aerogel monoliths are disclosed in US 2012/0034442 and Worsley et al., *Chem. Commun.*, 2012, 48, 8428-8430, both of which are incorporated herein by reference in its entirety.

The solution for immersing the graphene aerogel can comprise, for example, water and/or at least one organic solvent. The precursor of the metal chalcogenide compound can comprise, for example, a molybdenum salt, a tungsten salt, a iron salt, a nickel salt, a cobalt salt, a zinc salt, a indium salt and/or a cadmium salt. In one particular embodiment, the metal salt comprises a molybdenum salt and/or a tungsten salt. In another particular embodiment, the metal salt comprise $(NH_4)_2MoS_4$.

The concentration of the metal chalcogenide precursor in the mixture can be, for example, 0.02-10 M, or 0.05-5 M, or 0.1-2M. In addition, the mixture can further comprise at least one reducing agent and at least one catalyst. Suitable catalysts and reducing agents have been describe in the foregoing paragraphs.

The curing, drying, and/or annealing conditions have been described in the foregoing paragraphs.

Other Carbon-Chalcogenide Assembly

Many embodiments described herein also relate to a composition comprising at least one porous carbon aerogel-supported assembly, which comprises (i) a porous carbon aerogel, and (ii) at least one metal chalcogenide compound disposed on said graphene sheets, wherein the chalcogen of said metal chalcogenide compound is selected from S, Se and Te.

In one embodiment, the porous carbon aerogel is a mechanically robust, electrically conductive ultralow-density carbon nanotube-based aerogel, which can be produced as described in US 2010/0187484, incorporated herein by referenced in its entirety.

In one embodiment, the porous carbon aerogel is a high surface area, electrically conductive nanocarbon-supported metal oxide composite, which can be produced as described in US 2012/0122652, incorporated herein by referenced in its entirety.

In one embodiment, the porous carbon aerogel is a high surface area silicon carbide-coated carbon aerogel, as well as a metal carbide, metal nitride, or metal carbonitride-coated carbon aerogel, which can be produced as described in US 2012/0077006, incorporated herein by referenced in its entirety.

The metal chalcogenide compound can comprises, for example, S. The metal chalcogenide compound can be, for example a metal sulfide. Combination of metal sulfide can be used.

The metal chalcogenide compound can comprises, for example, one or more metals. The metal chalcogenide compound can comprises, for example, at least one of Mo, W, Fe, Cd, In, Zn, Ni and Co. The metal chalcogenide compound can comprise, for example, at least one of Mo and S. The metal chalcogenide compound can comprise, for example, Mo and another metal, such as Ni or Co.

The metal chalcogenide compound can comprise, for example, at least one of $MoS_2$, $WS_2$, $In_2S_3$, CdTe and ZnTe, or any combination thereof. Blend of $MoS_2$ and $WS_2$ can be used. The metal chalcogenide compound can comprise, for example, Ni—Mo-sulfide or Co—Mo-sulfide.

The weight percentage of metal chalcogenide in the porous carbon aerogel-supported metal chalcogenide assembly can be, for example, 5-95%, or 10-90%, or 20-80%, or 30-60%, or at least 20%, or at least 30%, or at least 50%.

The porous carbon aerogel-supported metal chalcogenide assembly can be a monolith having a size of, for example, or $10^3$ μm$^3$ or more, or $10^6$ μm$^3$ or more, or 1 mm$^3$ or more, or 1 cm$^3$ or more, or about $10^3$ μm$^3$ to about 1 mm$^3$, or from about 1 mm$^3$ to about $10^3$ cm$^3$.

The porous carbon aerogel-supported metal chalcogenide assembly can have a thickness of, for example, 10 μm or more, or 100 μm or more, or 1 mm or more, or 1 cm or more, or about 10 μm to about 10 cm.

The porous carbon aerogel-supported metal chalcogenide assembly can have a conductivity of, for example, at least 0.5 S/cm, or at least 1 S/cm, or at least 5 S/cm, or at least 20 S/cm, or about 0.5-60 S/cm, or about 5-40 S/cm.

The porous carbon aerogel-supported metal chalcogenide assembly described herein can have a surface area of, for example, of 300 m$^2$/g or more, or 500 m$^2$/g or more, or 700 m$^2$/g or more, or about 300-1500 m$^2$/g.

The porous carbon aerogel-supported metal chalcogenide assembly described herein can have an compressive modulus of, for example, 10 MPa or more, or 50 MPa or more, or 100 MPa or more, or about 10-1000 MPa.

Applications

Figure 6:
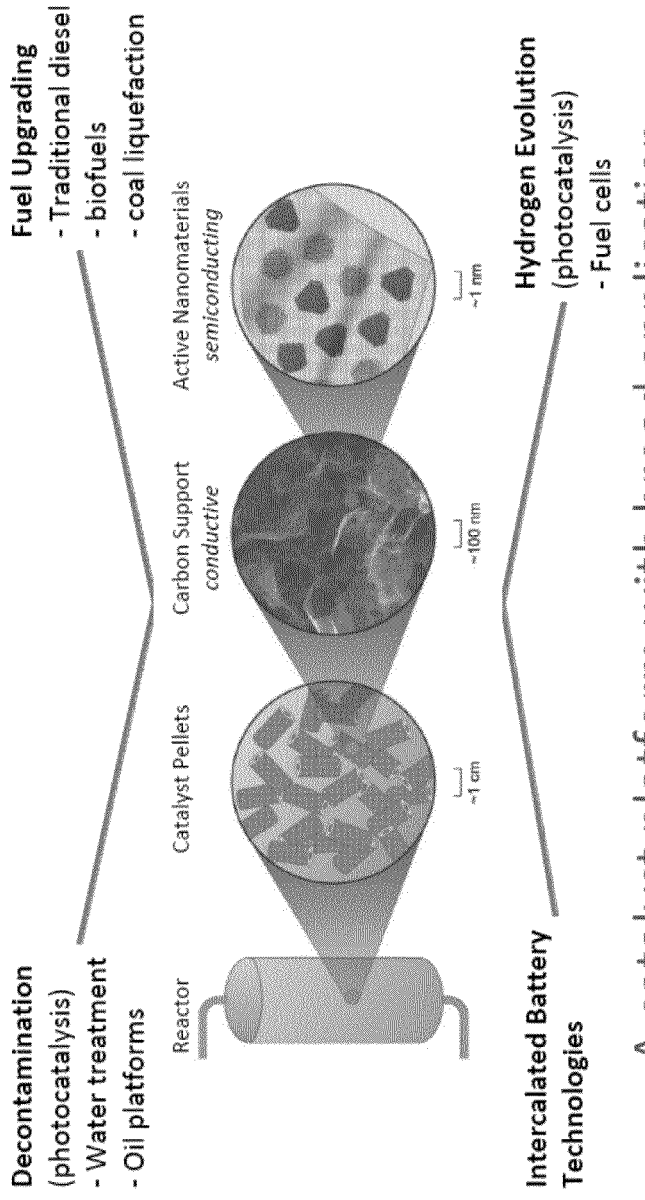
FIG. 6 shows a schematic illustration of the applications for the carbon-chalcogenide assembly described herein.

The graphene-supported metal chalcogenide assembly and/or porous carbon aerogel-supported metal chalcogenide assembly described herein can be used in a variety of applications, including, for example, Li storage, hydrogen evolution, decontamination, and fuel upgrading (coal, biofeedstock, etc). See FIG. 6.

In some embodiments, the graphene-supported metal chalcogenide assembly and/or porous carbon aerogel-supported metal chalcogenide assembly described herein can be used in Li storage. See Li et al., *J. Phys. Chem. Lett.* 3:2221-2227 (2012); Chang et al., *J. Mater. Chem.* 21:17175-17184 (2011); Chang et al., *J. Mater. Chem.* 21:6251-6257 (2011); and Li et al., *Material Letters* 63:13663-1365 (2009), all of which are incorporated herein by reference in their entireties.

In some embodiments, the graphene-supported metal chalcogenide assembly and/or porous carbon aerogel-supported metal chalcogenide assembly described herein can be used in hydrogen evolution. See Kibsgaard et al., *Nature Materials* 11:963-969 (2012); Benck et al., *ACS Catal.* 2:1916-1923 (2012); Li et al., *J. Am. Chem. Soc.* 133:7296-7299 (2011); Merki et al., *Chemical Science* 2, 1262 (2011); Merki et al., *Energy & amp; Environmental Science* 4, 3878 (2011); and Jaramillo et al., *J. Phys. Chem. C* 112:17492-17498 (2008), all of which are incorporated herein by reference in their entireties.

In some embodiments, the graphene-supported metal chalcogenide assembly and/or porous carbon aerogel-supported metal chalcogenide assembly described herein can be used in decontamination. See Chianelli et al., *Catalysis Reviews* 48:1-41 (2006); Abrams et al., *Critical Reviews in Solid State and Materials Sciences* 30:153-182 (2005); Thurston et al., *J. Phys. Chem. B* 103:11-17 (1999); and Wilcoxon et al., Photooxidation of Organic Wastes Using Semiconductor Nanoclusters, U.S. Department of Energy Final Report (1997), all of which are incorporated herein by reference in their entireties.

In some embodiments, the graphene-supported metal chalcogenide assembly and/or porous carbon aerogel-supported metal chalcogenide assembly described herein can be used in fuel upgrading. See Nogueira et al. *Applied Catalysis A: General* 429-430:92-105 (2012); Lauritsen et al., *Journal of Catalysis* 221:510-522 (2004); Lauritsen et al., *Journal of Catalysis* 224:94-106 (2004); Farag, *Catalysis Today*, 1-9 (1999); and Song et al., *Energy & amp; Fuels* 6, 619-628 (1992), all of which are incorporated herein by reference in their entireties.

Devices Comprising Graphene-Supported Metal Chalcogenide Assembly

Further embodiments relate to a device comprising the graphene-supported metal chalcogenide assembly and/or porous carbon aerogel-supported metal chalcogenide assembly described herein. Such device is particularly useful in coal liquefaction.

The direct coal liquefaction process (DCL) converts coals to synthetic crude oil by breaking down large hydrocarbon complexes (100 s of carbons) into smaller units (5-20 carbons). In the process, impurity atoms such as sulfur, nitrogen, and oxygen are removed and hydrogen is added. DCL accomplishes this though the Bergius process in which hydrogen, heat, and catalysts are used to cleave carbon-carbon bonds (i.e., cracking) and to upgrade products to higher hydrogen to carbon mole ratios (H/C):

$$nC + (n+1)H_2 \xrightarrow{\text{heat} \cdot \text{catalyst}} C_nH_{2n+2}$$

These steps are typically broken into two stages: liquefaction and hydrotreating, which have similar goals but often use different catalysts and reactor technologies. Additionally, coal liquefaction offers the option of co-feeding oils based on biofeedstocks that would lessen the overall plant carbon footprint.

Catalysts are vital for all aspects of the hydroprocessing train. Hydrogenation and hydrogenolysis catalysts are used to saturate carbonaceous macromolecules; hydrodesulfurization (HDS), hydrodenitrogenation (HDN), hydrocracking (HYC) catalysts are used to remove sulfur, nitrogen, and oxygen; hydrocracking catalysts (HYC) are used to break carbon-carbon bonds. Exemplary catalysts for local liquefaction are shown in the table below.

| Typical Catalyst | Primary Action | General name |
|---|---|---|
| NiMo-sulfide | Add H without breaking Carbon bonds | Hydrogenation (HYD) |
| NiMo-sulfide | Hydrogenolysis Remove oxygen | Hydrodeoxygenation (HDO) |
| CoMo-sulfide | Hydrogenolysis Remove sulfur | Hydrodesulfurization (HDS) |

-continued

| Typical Catalyst | Primary Action | General name |
|---|---|---|
| NiMo-sulfide | Hydrogenolysis Remove Nitrogen | Hydrodenitrogenation (HDN) |
| NiW-sulfide, ZrO2, Zeolites | Break C=C bonds | Hydrocracking (HYC) |

Figure 5:
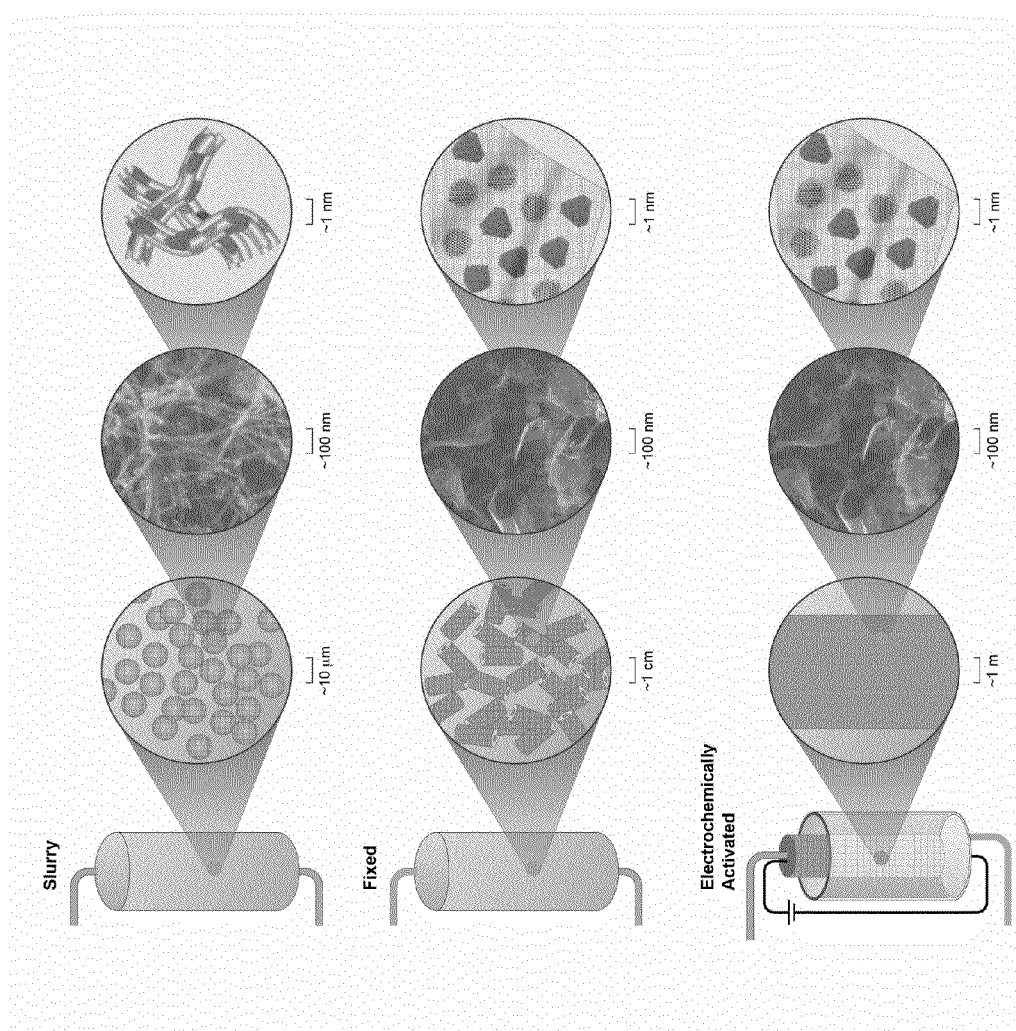
FIG. 5 shows a schematic visualization of three different elements suitable for as hydrotreating catalysts: (top) dispersible catalysts that enhance liquefaction and could be immediately used in coal liquefaction reactors; (middle) multifunctional monolithic catalysts that could be used in reactor bed technologies; (bottom) electrochemically activated catalysts, which have the potential to tune selectivity and dramatically increase activity.

The device described herein can comprise, for example, one or more catalysts selected from PE1, PE2, and PE3, which are disclosed in the following paragraphs. A first embodiment, PE1, relates to dispersible catalysts for enhancing coal liquefaction (FIG. 5, top). A second embodiment, PE2, relates to multifunctional monolithic catalysts suitable for use in reactor bed of coal liquefaction reactors (FIG. 5, middle). A third embodiment, PE3, relates to electrochemically activated catalysts, which have tunable selectivity and dramatically increase activity (FIG. 5, bottom).

PE1 can comprise, for example, a dispersible catalyst comprising the graphene-supported or porous carbon aerogel-supported metal sulfide assembly described herein. PE1 can comprise, for example, a porous carbon scaffold with a metal chalcogenide catalyst skin. PE1 can comprise, for example, a dispersible catalyst comprising a graphene-supported Ni—Mo-sulfide assembly.

The dispersible catalyst can be, for example, in the form of 10-100 μm colloids. The dispersible catalyst can be, for example, in the form of 1 mm spheres. The dispersible catalyst can have peak pore sizes in the range of 20-80 nm. Exemplary PE1 dispersible catalyst are shown in the table below.

| Form | Surface Area (m$^2$/g) | Pore (nm) | Catalyst Composition | C4 + Oil yield (wt % d.a.f.) | Residue Yield (wt % d.a.f.) |
|---|---|---|---|---|---|
| 10-100 μm colloids | 250-750 | 20-80 | NiMoS | >75% | <5% |
| 1 mm spheres | 250-750 | 20-80 | NiMoS | >75% | <5% |

PE2 can comprise, for example, a multifunctional monolithic catalyst comprising the graphene-supported or porous carbon aerogel-supported metal sulfide assembly described herein. PE2 can comprise, for example, a porous carbon scaffold with a catalyst skin that contains multiple catalyst types. PE2 can comprise, for example, a multifunctional monolithic catalyst comprising a graphene-supported Ni—Mo-sulfide assembly which further comprises ZrO2 or zeolites. The PE2 can be optimized for hydrotreating applications within an ebullating bed reactor.

PE2 can be fabricated by, for example, first depositing a partial coating of metal oxide onto the carbon scaffold as described in US 2012/0122652 and US 61/745,522, incorporated by reference in their entireties, and then depositing the metal sulfide using electrochemical deposition as described herein. The metal oxide nanoparticles deposited first would mask the underlying substrate so that subsequent electrochemical deposition of metal sulfide would occur in the conductive carbon regions not masked by the metal oxide.

PE3 can comprise, for example, an electrochemically activated/enhanced catalyst comprising the graphene-supported or porous carbon aerogel-supported metal sulfide assembly described herein. PE3 can comprise, for example, a highly conductive carbon scaffold with a metal chalcogenide catalyst skin. PE3 can comprise, for example, an electrochemically activated/enhanced catalyst comprising a graphene-supported Ni—Mo-sulfide assembly, which optionally comprises ZrO2 or zeolites. The PE3 can be optimized for electrocatalysis or adsorption-induced electrochemical promotion of catalysis (EPOC).

In electrocatalysis, the substrate acts as a reservoir that readily sinks or sources electrons to adsorbed intermediates (through the applied potential). The intermediates subsequently react with another surface or solution species and finally release from the catalyst as a converted product. This drives redox reactions by providing a surface for the intermediate to adsorb to and providing fast electron exchange. By contrast, EPOC occurs when the applied potential polarizes the surface thereby altering the work function. The change in surface work function modifies the adsorbate binding energy, which is directly related to catalysis rates. This follows Sabatier's principle of an optimal catalyst-adsorbate interaction strength—if binding is too weak adsorbates will not react and if binding is too strong adsorbates will poison the surface. Sweeping the applied potential, sweeps the work function, which sweeps the interaction strength. EPOC is a non-Faradaic effect thus the solution does not need to sustain a current.

A highly conductive scaffold, such as the graphene-supported or porous carbon aerogel-supported metal sulfide assembly described herein, is particularly suitable for use in PE3.

WORKING EXAMPLES

Example 1

Co-Synthesis of Graphene-MoS$_2$ Monolith

In a typical synthesis, 10 mg of graphene oxide (GO) were dispersed in 1 ml solution of N,N dimethylformamide (DMF) and water (H$_2$O) (9:1 ratio of DMF:H2O) via bath sonication. Next 22 mg of (NH$_4$)$_2$MoS$_4$ were dissolved into the suspension. Ammonium hydroxide (133 μl) were then added. The container was sealed and placed in an oven at 80 C for several hours. After gelation, 100 μl of hydrazine were added and the gel was returned to the oven for several hours. Finally, the wet gel was removed from the oven, washed in acetone and supercritically dried using liquid carbon dioxide. The resulting monolith is black in color and has a density of ~70 mg/cc (FIG. 1).

Figure 2:
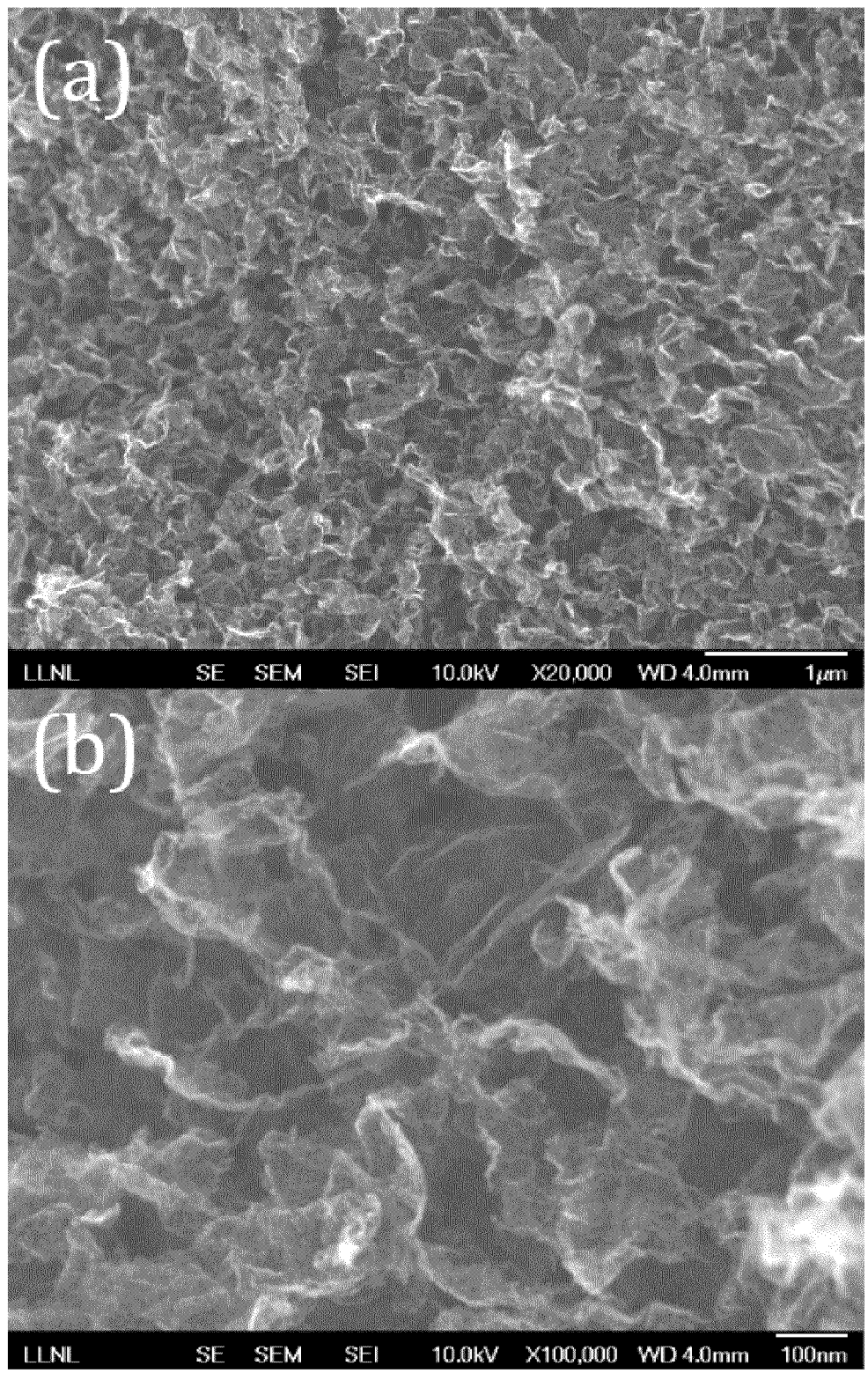
FIG. 2 shows SEM images of graphene-supported $MoS_2$ at (a) low and (b) high magnification.
Figure 3:
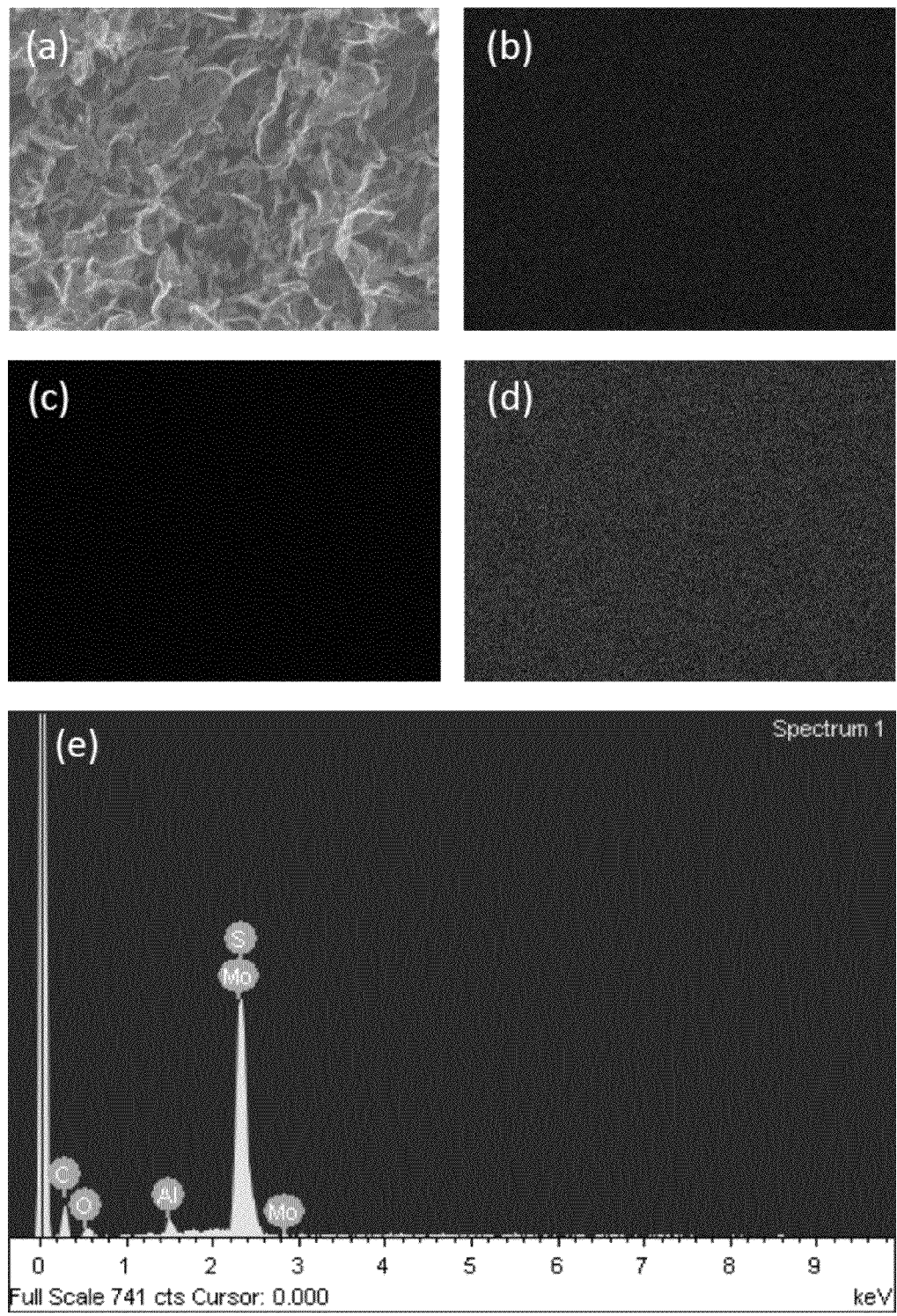
FIG. 3 shows (a) SEM image, EDX maps of (b) sulfur, (c) carbon, (d) molybdenum, and (e) EDX spectrum of graphene-supported $MoS_2$ monolith.
Figure 4:
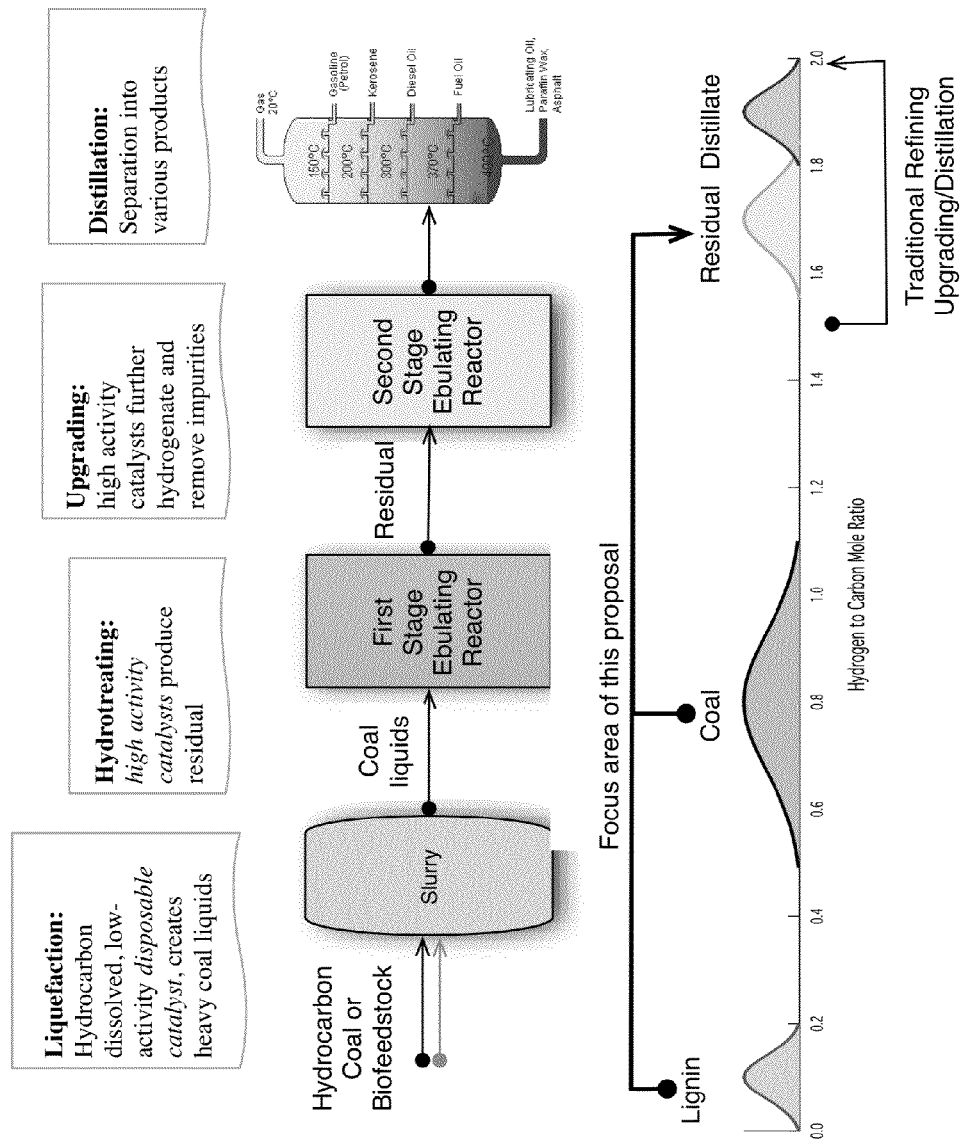
FIG. 4 shows a diagram of direct liquefaction process. Catalysts are used to increase the hydrogen to carbon ratio. Inexpensive catalysts are used in slurries during the liquefaction process, and high activity catalysts are used to convert coal liquids to residual. Traditional refining spans the upper end of the H:C range.

Scanning electron micrographs of the graphene-supported MoS$_2$ is shown in FIG. 2. The images show a 3D network of randomly oriented sheet-like structures similar to those seen in previous reports on reduced GO. This results that the GO gelled as in previous studies and any MoS$_2$ formed would be limited to the surfaces of the graphene sheets. Energy dispersive x-ray (EDX) analysis confirms the presence of MoS$_2$ with a Mo:S ratio of 0.5 and indicates that it makes up ~60 wt % of the total structure. EDX maps show that the MoS$_2$ was uniformly distributed over the graphene surface (FIG. 3). Nitrogen porosimetry measured a surface area of 451 m$^2$/g and mesopore volume of 1.16 cm$^3$/g.

Metal chalcogenide, such as metal sulfide, was previously prepared by a number of techniques, ranging from sol-gel synthesis to chemical vapor deposition to various templating/support methods. For example, the porous MoS$_2$ materials showed enhanced catalytic activity, compared to bulk material, but most were still limited to surface areas of approximately 100 m2/g. This was even the case when using high surface area templates such as SBA-15 or MCM-41. Surface areas for the templated MoS$_2$ can be less than 200 m2/g. In addition, there were limited work involving the use of carbon-based templates/supports which would greatly enhance the electrical conductivity of the MoS$_2$ structures used for some electrochemical and catalytic applications. Lastly, only recently was there a report on the fabrication of the MoS$_2$/graphene composite that exhibits enhanced hydrogen evolution (Dai et al., *J. Am. Chem. Soc.* 133:7296-7299 (2011)). However, this material appeared to be in the form of powder, required high temperatures (200 C) and pressures (>1 atm) to fabricate, and was not reported to have surface area.

Here, a high surface area 3D graphene-supported MoS$_2$ monolith was made by the simultaneous gelation and reduction of graphene oxide and (NH$_4$)$_2$MoS$_4$ at low temperatures/pressures (e.g., 80 C/1 atm). The resulting dried monoliths had a Mo:S ratio of 0.5 and were ~60 wt % MoS$_2$. Surfaces areas of ~450 m$^2$/g were observed by N$_2$ porosimetry. This route to high surface area graphene-supported MoS$_2$ is applicable to a wide range of chalcogenides, including WS$_2$, CdTe, In$_2$S$_3$, ZnTe, etc.

Example 2

Chemical Deposition of MoS$_2$ in Prefabricated Graphene Aerogel

The graphene aerogel was synthesized as described in Worsley et al., *Chem. Commun.* 48:8428-8430 (2012), incorporated herein by reference in its entirety. In a typical synthesis, 22 mg of (NH$_4$)$_2$MoS$_4$ were dissolved in a 1 ml solution of N,N dimethylformamide (DMF) and water (H$_2$O) (9:1 ratio of DMF:H$_2$O) via bath sonication. Next the graphene aerogel (GA) was immersed in the solution. Ammonium hydroxide (133 µl) and hydrazine (100 µl) were then added. The container was sealed and placed in an oven at 80 C for several hours. The wet gel was removed from the oven, washed in acetone and supercritically dried using liquid carbon dioxide. Finally samples were annealed at 1050 C in nitrogen for 3 hours.

What is claimed is:

1. A composition comprising at least one graphene-supported assembly, which comprises (i) a three-dimensional network of graphene sheets crosslinked by covalent carbon bonds and (ii) at least one metal chalcogenide compound disposed on said graphene sheets, wherein the chalcogen of said metal chalcogenide compound is selected from S, Se and Te, and wherein the metal chalcogenide compound accounts for at least 20 wt. % of the graphene-supported assembly.

2. The composition of claim 1, wherein metal chalcogenide compound is a catalyst for hydrogenation, hydrodeoxygenation, hydrodesulfurization, hydrodenitrogenation, and/or hydrocracking.

3. The composition of claim 1, wherein the graphene-supported assembly is electrically conductive.

4. The composition of claim 1, wherein the graphene-supported assembly has a conductivity of at least 0.5 S/cm.

5. The composition of claim 1, wherein the graphene-supported assembly is a monolith having a size of at least 1 mm$^3$, or in the form of a powder produced by grinding or ball-milling said monolith.

6. The composition of claim 1, wherein the graphene-supported assembly has an elastic modulus of at least 10 MPa.

7. The composition of claim 1, wherein the chalcogen is S.

8. The composition of claim 1, wherein the metal chalcogenide compound comprises one or more of Mo, W, Fe, Cd, In, Zn, Ni and Co.

9. The composition of claim 1, wherein the metal chalcogenide compound comprises Mo and optionally comprises another metal.

10. The composition of claim 1, wherein the metal chalcogenide compound comprises MoS$_2$, WS$_2$, In$_2$S$_3$, CdTe, ZnTe, or any combination thereof.

11. The composition of claim 1, wherein the metal chalcogenide compound comprises MoS$_2$.

12. The composition of claim 1, wherein the graphene-supported assembly has a surface area of at least 250 m$^2$/g.

13. The composition of claim 1, wherein the graphene-supported assembly has a mesopore volume of at least 0.5 cm$^3$/g.

14. The composition of claim 1, wherein the metal chalcogenide compound comprises MoS$_2$, wherein the metal chalcogenide compound accounts for at least 30 wt % of the graphene-supported assembly, wherein the graphene-supported assembly has a surface area of at least 300 m$^2$/g; and wherein the graphene-supported assembly is a monolith having a size of at least 1 mm$^3$.

15. The composition of claim 1, wherein the surfaces of the graphene sheets are substantially free of carbon nanoparticles, and wherein the covalent carbon bonds crosslinking the grapheme sheets are primarily sp$^2$ bonds.

16. The composition of claim 1, wherein the metal chalcogenide compound is Ni—Mo-sulfide or Co—Mo-sulfide.

17. The composition of claim 1, further comprising (iii) at least one metal oxide, metal carbide or metal nitride deposited on said graphene sheets.

18. A method for making the composition of claim 1, comprising:
preparing a reaction mixture comprising (i) graphene oxide (GO), (ii) at least one precursor of a metal chalcogenide compound, and (iii) at least one catalyst;
curing the reaction mixture to produce a gel;
reducing the gel with at least one reducing agent;
drying the gel to produce a graphene-based monolith.

19. The method of claim 18, wherein the reaction mixture comprises at least one organic solvent and/or water.

20. The method of claim 18, wherein the catalyst comprises ammonium hydroxide.

21. The method of claim 18, wherein the reducing agent comprises hydrazine.

22. The method of claim 18, wherein the precursor of the metal chalcogenide compound is (NH$_4$)$_2$MoS$_4$.

23. The method of claim 18, wherein the reaction mixture is cured at a temperature of 100° C. or less.

24. The method of claim 18, wherein the reaction mixture is cured at ambient pressure.

25. The method of claim 18, wherein the step of drying the gel comprises solvent exchange.

26. The method of claim 18, wherein the step of drying the gel comprises supercritical drying.

27. The method of claim 18, wherein metal chalcogenide compound is MoS$_2$.

28. The method of claim 18, wherein metal chalcogenide compound is MoS$_2$, and wherein the method further comprises incorporating Ni or Co into the graphene-supported assembly.

29. The method of claim 18, comprising simultaneous gelation and reduction of grapheme oxide and (NH$_4$)$_2$MoS$_4$ at a temperatures of 100° C. or less.

30. The method of claim 18, comprising:
dispersing GO in a solution of DMF and water via bath sonication to produce a suspension,
dissolved (NH$_4$)$_2$MoS$_4$ into said suspension,
adding ammonium hydroxide to said suspension,
heating said suspension to produce a first gel,
adding hydrazine to said first gel, heating said first gel and said hydrazine to produce a second gel, washing said second gel in acetone, and supercritically drying said second gel with liquid carbon dioxide.

31. A method for producing the composition of claim 1, comprising:

providing a graphene aerogel, wherein the graphene aerogel comprises a three-dimensional network of graphene sheets crosslinked by covalent carbon bonds;

immersing said graphene aerogel in a solution comprising at least one precursor of a metal chalcogenide compound to form a mixture;

curing said mixture to obtain a wet gel;

drying said wet gel to obtain a dry gel; and annealing said dry gel to obtain the graphene-supported assembly.

32. The method of claim 31, wherein the step of curing comprises curing wet gel at a temperature of 100° C. or less, wherein the step of drying comprises solvent exchange and supercritical drying, and wherein the step of annealing comprises annealing the dry gel at least 600° C. in an inert atmosphere.

33. The method of claim 31, wherein metal chalcogenide compound is $MoS_2$, and wherein the method further comprises incorporating Ni or Co into the graphene-supported assembly.

34. A graphene-supported assembly comprising a three-dimensional network of covalently interconnected graphene sheets and $MOS_2$ disposed on said graphene sheets, wherein the $MOS_2$ accounts for at least 20 wt. % of the graphene-supported assembly.

* * * * *